(12) United States Patent
Dreiling

(10) Patent No.: US 12,144,062 B2
(45) Date of Patent: Nov. 12, 2024

(54) AUDIO ENCODING AND TRANSMISSION OF IDENTIFIER TO ASSIST IN ESIM RESERVATION PROCESS

(71) Applicant: T-Mobile Innovations LLC, Overland Park, KS (US)

(72) Inventor: Ryan Patrick Dreiling, Shawnee, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 196 days.

(21) Appl. No.: 17/539,950

(22) Filed: Dec. 1, 2021

(65) Prior Publication Data

US 2023/0171588 A1    Jun. 1, 2023

(51) Int. Cl.
*H04W 4/60* (2018.01)
*H04W 8/18* (2009.01)
*H04W 8/20* (2009.01)

(52) U.S. Cl.
CPC ............. *H04W 8/205* (2013.01); *H04W 4/60* (2018.02); *H04W 8/183* (2013.01)

(58) Field of Classification Search
CPC ........ H04W 8/205; H04W 4/60; H04W 8/183
See application file for complete search history.

(56) References Cited

U.S. PATENT DOCUMENTS

| | | |
|---|---|---|
| 8,707,452 B1 | 4/2014 | Block et al. |
| 11,323,877 B1 * | 5/2022 | Verma .................. H04W 12/06 |
| 2019/0122214 A1 * | 4/2019 | Chau .................. G06Q 20/3278 |
| 2019/0141491 A1 * | 5/2019 | Balasaygun ............ H04L 67/63 |
| 2021/0110364 A1 * | 4/2021 | Scholl .................. G06Q 20/16 |
| 2021/0392488 A1 * | 12/2021 | Barry ................... H04W 8/183 |
| 2022/0038982 A1 * | 2/2022 | Boyapalle ............. H04W 36/14 |

FOREIGN PATENT DOCUMENTS

EP    4021042 A1 *    6/2022    ............ H04W 8/183

* cited by examiner

*Primary Examiner* — Jinsong Hu
*Assistant Examiner* — Farideh Madani
(74) *Attorney, Agent, or Firm* — Shook, Hardy & Bacon L.L.P.

(57) ABSTRACT

In various examples, a user seeking to switch network providers may reserve an eSIM profile through touch selection of the display of a UE, which causes encoding and transmission of an identifier associated with the UE to a network operator. As a result, human error both in transmitting and receiving the identifier needed to reserve an eSIM profile is eliminated. And the time needed to identify and transmit the identifier is significantly reduced in comparison to orally conveying the identifier to a customer services representative or keying in the identifier, and then verifying the identifier with the representative.

15 Claims, 5 Drawing Sheets

AUDIO ENCODING AND TRANSMISSION OF IDENTIFIER TO ASSIST IN ESIM RESERVATION PROCESS

BACKGROUND

A cell phone (user equipment (UE)) may be equipped with a subscriber identity module (SIM)-a small removable chip that may be used by a mobile network operator (e.g., a carrier) to authenticate and identify a subscriber's UE. Recently, however, there has been a shift away from UEs that use a traditional SIM. These UEs may include an embedded Universal Integrated Circuit Card (eUICC). An electronic SIM (eSIM) profile may be downloaded and stored in the eUICC of the UE so that the UE may be activated on a given mobile network without the need for a physical SIM. An eUICC ID (EID)—a thirty-two digit numerical string that uniquely identifies an eUICC—may also be stored on these UEs. One of the benefits of an eSIM is that it makes switching between carriers easier. For example, a mobile network operator may remotely program a subscriber's UE, and as such, the subscriber may no longer have to wait for a new SIM to arrive in the mail when switching between carriers.

In the case of a new eSIM-capable UE, the original equipment manufacturer of the UE (e.g., a device OEM) may label/barcode the back of the UE with the EID identifying the eUICC of the UE. The network operator may then scan this label/barcode in order to reserve an eSIM profile and activate the eSIM and UE on the network. In other examples, such as where the device OEM is supplying a significant number of UEs to the network operator, the device OEM may alternatively transmit device inventory field files to the operator corresponding to each of the UEs. The operator may then ingest the EID for each of the UEs from these field files. In the case of new subscribers that wish to use their existing eSIM-capable UEs instead of purchasing a new UE, however, these provisioning methods may be unavailable, which may require that the subscriber engage with a customer service representative for the network operator. For example, the subscriber may be forced to orally convey this thirty-two digit identifier to the customer service representative or key in the identifier in order to reserve an eSIM profile. This may be cumbersome, time consuming, and/or prone to error.

SUMMARY

The present disclosure is directed, in part, to systems, methods, and computer-readable storage media for eSIM profile reservations for user equipment substantially as shown in and/or described in connection with at least one of the figures, and as set forth more completely in the claims. In embodiments, a user seeking to provision a UE for operation on a network may send a request from the UE requesting an eSIM profile from the network operator. The UE may receive in response from the network operator a request to provide an identifier. In embodiments, this identifier may uniquely identify an eUICC of the UE, such as an EID. The UE may receive a touch indication on a display of the UE indicating a selection of the identifier and may then encode the identifier. By transmitting the encoded identifier from the UE, the eSIM profile may be reserved for the UE. In this way and in contrast to conventional approaches, a subscriber may reserve an eSIM profile without having to engage with a customer care representative, including having to orally provide or key in the EID associated with the subscriber's UE, thereby saving time and avoiding the errors associated with attempting to accurately convey a thirty-two digit identifier. This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Illustrative embodiments of the present invention are described in detail below with reference to the attached figures, which are intended to be exemplary and non-limiting, wherein.

DETAILED DESCRIPTION

Systems, methods, and computer-readable storage media are disclosed that relate to the reservation of an eSIM profile for a UE without the need to engage with a customer services representative for a network operator. The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Figure 1:
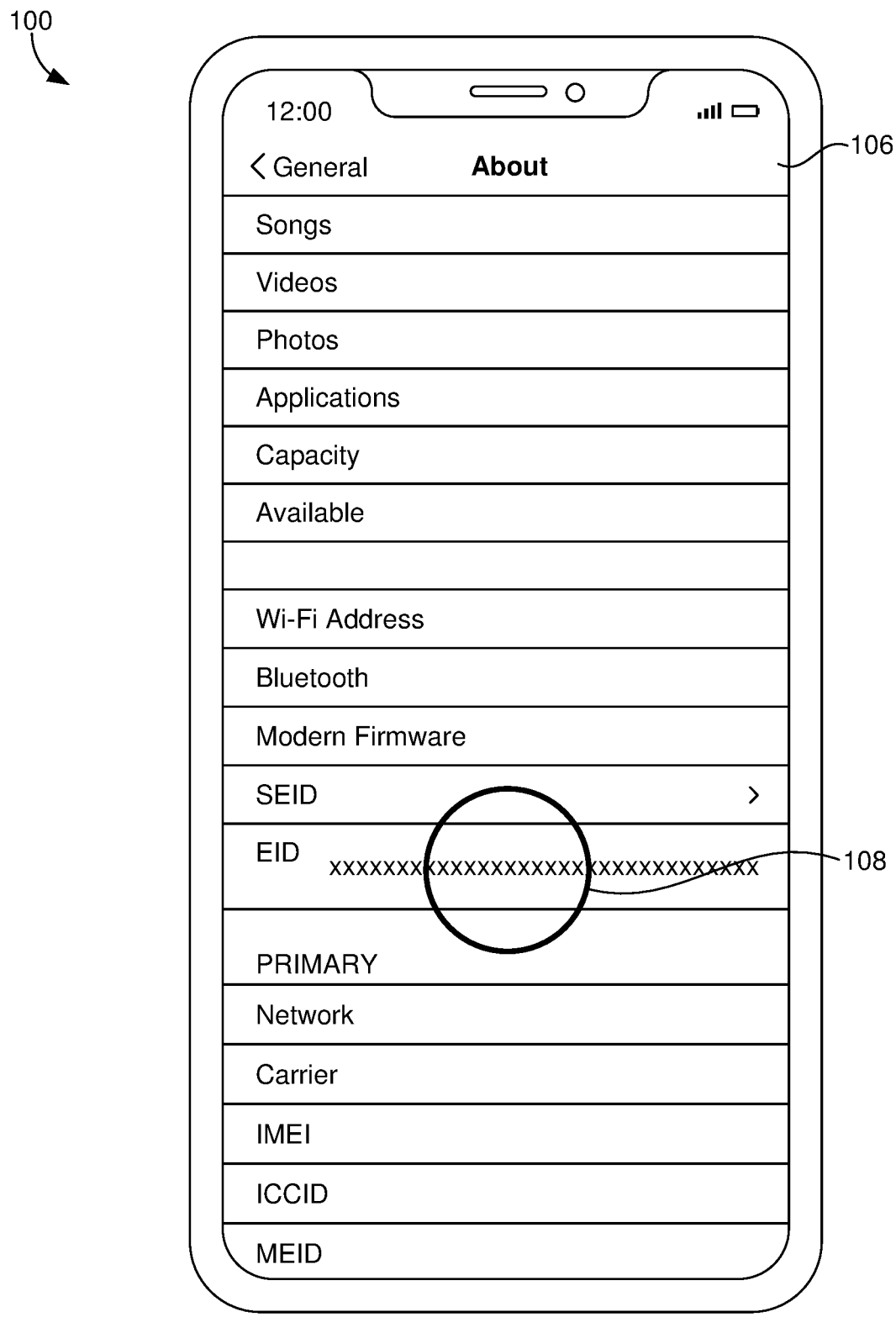
FIG. 1 illustrates an example UE menu in accordance with embodiments of the present disclosure.

In certain aspects, an eSIM reservation method is provided. In embodiments, a UE may send a request to reserve an eSIM profile. In examples, the request may include the initiation of a voice call from the UE to the network operator for which service is sought. The UE may receive in response a request or prompt to provide an identifier. In examples, the request may be a request from the network operator for a numerical identifier. In more specific examples, the request may be for an identifier that uniquely identifies the eUICC of the UE, such as a thirty-two digit EID. In embodiments, the request from the network operator may be in the form of an audio recording or a live request. In examples, the user, in response to the request, may navigate to a menu that displays one or more identifier, including the identifier requested. For example, identifiers associated with the UE, such as the EID, a serial number, an International Mobile Station Equipment Identity (IMEI), an integrated circuit card ID (ICCID), and/or a mobile equipment identifier (MEID), may be presented on the display of the UE. In still further examples, a shortened identifier representing the full identifier may be presented on the display of the UE. For example, instead of actually displaying one or more identifiers, which may be excessively lengthy, words such as EID, SEID, IMEI, ICCID, and/or MEID or the like may be presented on the display of the UE. In embodiments, the UE may receive a touch indication on the display indicating a selection of the identifier. For example, the user of the UE may select the identifier, such as the EID presented on the display of the UE. FIG. 1 illustrates an example UE menu in accordance with embodiments of the present disclosure. The user of the UE 100 may navigate to a menu 106 that displays various identifiers such as an EID 108, e.g. a 32-digit identifier, and tap this lengthy identifier (as opposed to having to orally convey it or key it in). The identifier may subsequently be encoded. For example, the UE may encode/convert the selected identifier into one or more audible in-band telecommunications signals. In other examples, the UE may encode/convert the selected identifier into one or more dual-tone multi-frequency (DTMF) signals. The eSIM profile may then be reserved for the UE by transmitting the encoded identifier from the UE. In this way, human error both in transmitting and receiving the identifier is eliminated. Moreover, the time needed to identify and transmit the identifier is significantly reduced in comparison to a subscriber having to orally convey the identifier to a customer services representative (or key in the identifier), and then verify the identifier with the representative.

In other aspects, a system in a communication network is provided comprising a processor and one or more computer storage hardware devices. The one or more computer storage hardware devices may store computer-usable instructions that, when used by the processor, cause the processor to send a request to reserve an embedded SIM profile. The one or more computer storage hardware devices may also store computer-usable instructions that, when used by the processor, receive a request to provide an identifier in response to the request to reserve the eSIM profile. In addition, the one or more computer storage hardware devices may store computer-usable instructions that, when used by the processor receive a touch indication on the display indicating a selection of an identifier. In embodiments, the one or more computer storage hardware devices may also store computer-usable instructions that, when used by the processor encode the identifier. Moreover, the one or more computer storage hardware devices may store computer-usable instructions that, when used by the processor cause the eSIM profile to be reserved for the UE by transmitting the encoded identifier from the UE.

In still other aspects, a computer-readable storage media having stored thereon executable instructions that when executed by a processor of a computing device may control the computing device to perform steps for reserving an eSIM profile is provided. The steps may include sending a request to reserve an embedded subscriber identity module (eSIM) profile. The steps may also include receiving a request to provide an identifier in response to the request to reserve the eSIM profile. The steps may also include receiving a touch indication on the display, which indicates that the identifier has been selected, and encoding the identifier. Furthermore, the steps may also include causing the eSIM profile to be reserved by transmitting the encoded identifier.

Figure 2:
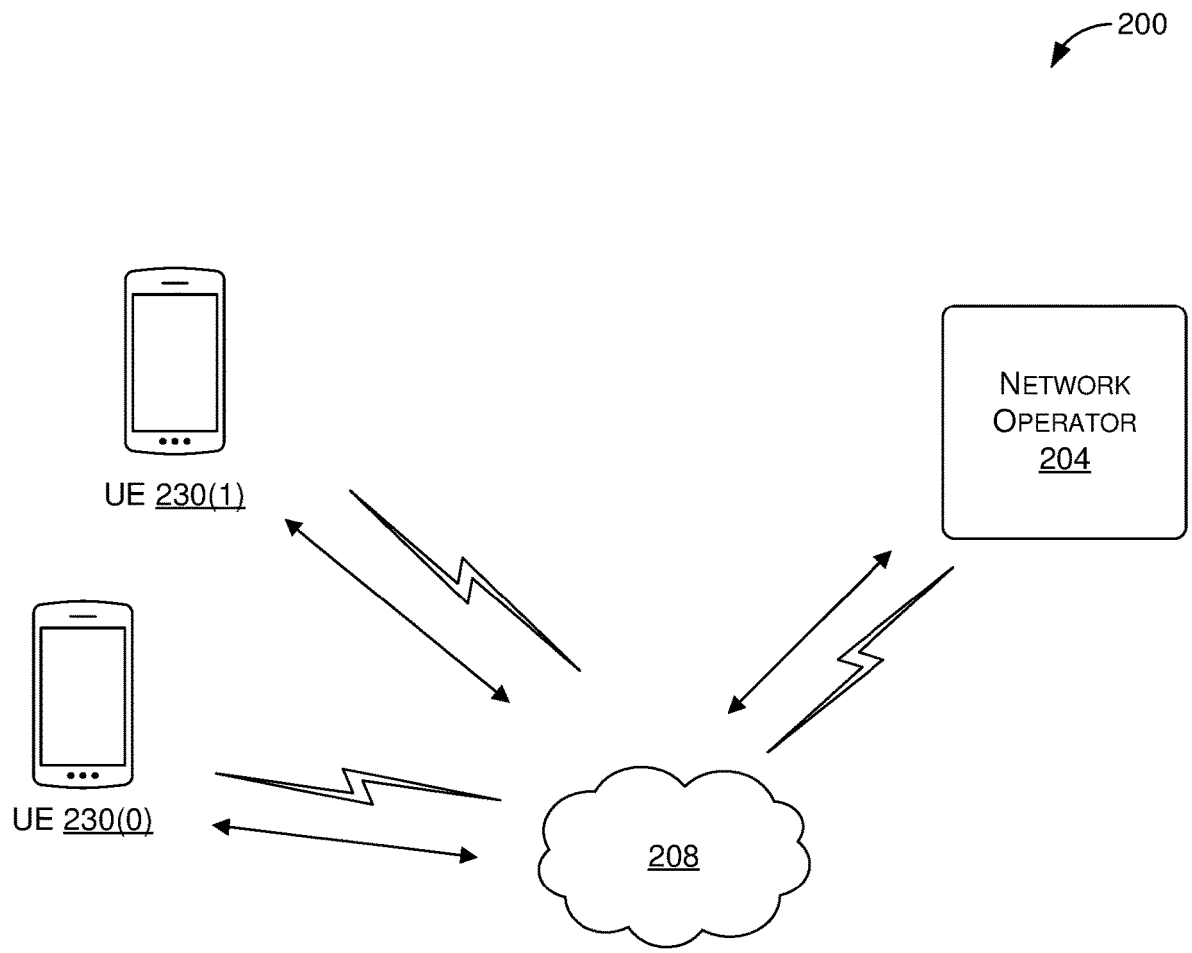
FIG. 2 illustrates a high-level example of a network environment in accordance with embodiments of the present disclosure.

FIG. 2 depicts a high-level example of a network environment 200 in accordance with embodiments of the present disclosure. The network environment 200 may include one or more UEs 230 (230(0), 230(1)) and a network operator 204. In some examples, the mobile network operator 204 may be the operator that users of the one more UEs 230 wish to switch their service. The one or more UEs 230 may be able to communicate with the network operator 204 over a network 208. The network 208 may include a cellular network, the Internet, and/or other networks. For example, one or more of the UEs 230 may initiate communication with the network operator 104 through a voice call. The network environment 200 is but one example of a suitable network environment and is not intended to suggest any limitation as to the scope of use or functionality of the disclosure. Neither should the network environment 200 be interpreted as having any dependency or requirement relating to any one or combination of components illustrated.

In some embodiments, the network environment 200 may be a telecommunication network (e.g., a telecommunication network such as, but not limited to, a wireless telecommunication network), or portion thereof. The network environment 200 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition, the network environment 200 may be utilized in a variety of manners, such as a single network, multiple networks, or as a network of networks, but, ultimately, is shown as simplified as possible to avoid the risk of confusing other aspects of the present disclosure.

The network environment 200 may include or otherwise may be accessible through a cell site. The cell site may include one or more antennas, base transmitter stations, radios, transmitter/receivers, digital signal processors, control electronics, GPS equipment, power cabinets or power supply, base stations, charging stations, etc. such that the cell site may provide a communication link between the one or more user devices 230 and other components, systems, equipment, and/or devices of the network environment 200. The base station and/or a computing device (e.g., whether local or remote) associated with the base station may manage or otherwise control the operations of components of the cell site.

In some embodiments, the one or more UEs 230 may take the form of one or more wireless or mobile devices capable of communication via the network environment 200. For example, one or more user devices 230 may take the form of one or more mobile devices capable of communication via a telecommunication network such as, but not limited to, a wireless telecommunication network. In this regard, user device 230 may be any mobile computing device that communicates by way of a network, for example, a 3G, CDMA, 4G, LTE, WiMAX, 5G, 6G or any other type of network.

The network environment 200 in certain embodiments may be structured to connect subscribers to a service provider or a plurality of service providers. Alternatively or additionally, the network environment 200 may be associated with a specific telecommunication provider that provides services (e.g. 5G, voice, location, etc.) to one or more user devices 230. For example, the user devices 230 may be subscribers to a telecommunication service provider, in which the user devices are registered or subscribed to receive voice and data services over the network environment 200. The network environment 200 may include any communications network providing voice and/or data service(s), such as circuit-switched and/or packet-switched networks, such as, for example, a 1× circuit voice, a 3G network (e.g., CDMA, CDMA 2000, WCDMA, GSM, UMTS, a 4G network (LTE, WiMAX, HSDPA), 5G, or a 6G network.

Having described network environments 200 and components operating therein, it will be understood by those of ordinary skill in the art that the network environment 200 is but an example of a suitable network and is not intended to limit the scope of use or functionality of aspects described herein. Similarly, network environment 200 should not be interpreted as imputing any dependency and/or any requirements with regard to each component and combination(s) of components illustrated in FIG. 2. It will be appreciated by those of ordinary skill in the art that the number, interactions, and physical location of components illustrated in FIG. 2 is an example, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 2 for simplicity's sake. As such, the absence of components from FIG. 2 should not be interpreted as limiting the present invention to exclude additional components and combination(s) of components. Moreover, though components may be represented as singular components or may be represented in a particular quantity in FIG. 2 it will be appreciated that some aspects may include a plurality of devices and/or components such that FIG. 2 should not be considered as limiting the quantity of any device and/or component.

Figure 3:
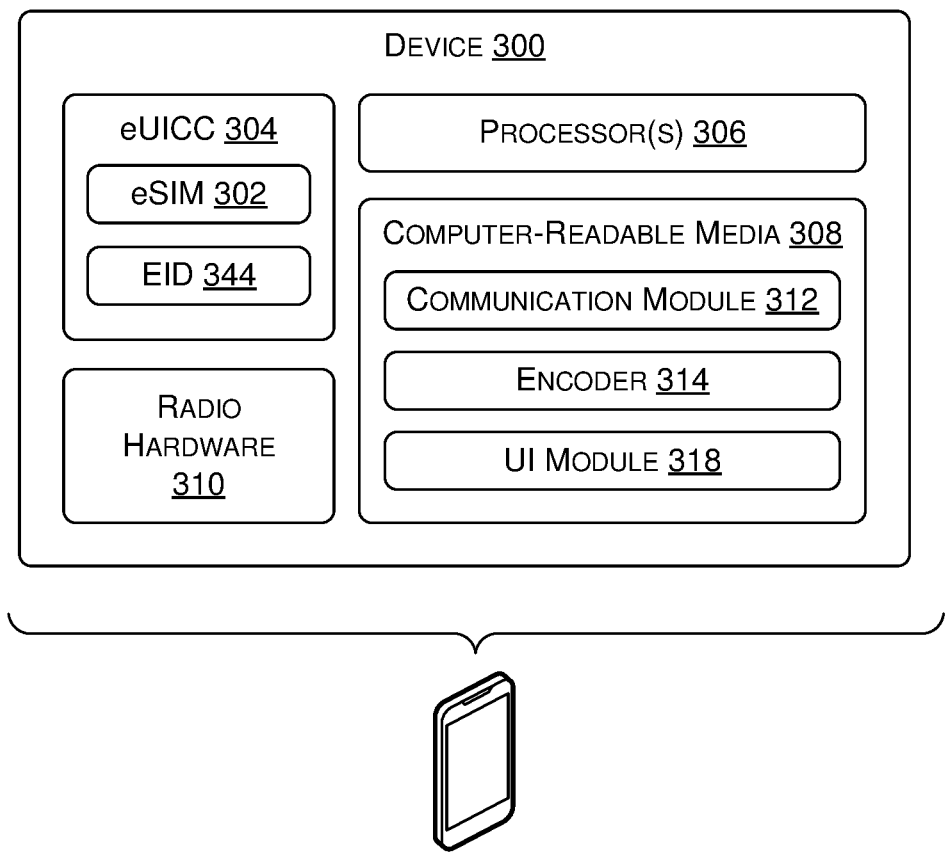
FIG. 3 illustrates an example computing device suitable for use in implementations of the technology described herein is provided.

FIG. 3 illustrates an example computing device 300 that may be used to reserve an eSIM profile from a network operator for gaining access to the network operator's services. The computing device 300 may correspond to the one or more UEs 130 described above with reference to FIG. 1. The computing device 300 may correspond to user equipment (UE), which can be operated by a user (e.g., an account holder). The user may be an entity (e.g., person, company, etc.) that subscribes (or desires to subscribe) to services, such as telecommunication services, via a service plan. The service plan may indicate an amount of data, voice calling, and/or text messaging available to the computing device 300, whether data, voice calling, and/or text messaging is available internationally, data transmission speeds accessible to the computing device 300, etc. The service plan may be available to the user for a particular rate. In some examples, the service plan may be active for a particular period of time (e.g., a two-year plan, a five-year plan, etc.).

The computing device 300 may correspond to a UE including, but not limited to, a smart phone, a personal digital assistant, a netbook, a laptop computer, a smart appliance, and/or another electronic device that is capable of sending or receiving voice, video, and/or data via network(s) (e.g., network(s) 200). In at least one example, the computing device 300 may include an eUICC 304, which may be an integrated memory chip and which may store and/or have the ability to store an eSIM profile 302. The eUICC 304 may also store personal information of a user, such as, but not limited to, data associated with a phone number of a user associated with the computing device 300, an address book of the user, text messages sent and received via the computing device 300, and other data. The eUICC 304 may include software that allows the computing device 300 to be remotely provisioned, e.g. activated on a mobile network. In at least one example, the eUICC 304 may be associated with an identifier. The identifier may be a numerical identifier that uniquely identifies the eUICC 304 and may be stored on the computing device 300. That is, the identifier may uniquely identify the eUICC 304 that is associated with the computing device 300. In at least one example, the identifier may be an EID 344. In at least one example, the eUICC 304 may be associated with one or more profiles. These one or more profiles may be eSIM profiles. These profiles may indicate which service plans, services, functionalities, etc. are available for the computing device 300. These profiles may be associated with data including account information (e.g., a subscription key, identity and/or service provider profiles, etc.).

The computing device 300 may include processor(s) 306, computer-readable media 308, and radio hardware 310. The processor(s) 306 may represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 306 may execute one or more modules and/or processes to cause the computing device 300 to perform a variety of functionalities, as set forth above and explained in further detail in the following disclosure. Additionally, each of the processor(s) 306 can possess its own local memory, which also can store program modules, program data, and/or one or more operating systems.

Depending on the exact configuration and type of the computing device 300, the computer-readable media 308, can include computer storage media and/or communication media. Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 308 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the computing device 300. Any such non-transitory computer-readable media can be part of the computing device 300.

In contrast, communication media includes computer readable instructions, data structures, program modules, or other data in a modulated data signal, such as a carrier wave, or other transmission mechanism. As defined herein, computer storage media does not include communication media.

The computer-readable media 308 can include one or more modules and data structures including, for example, a communication module 312 and a user interface (UI) module 318. The one or more modules and data structures can be in the form of stand-alone applications, productivity applications, an operating system component, or any other application or software module configured to facilitate the acquisition of profile(s) from service provider(s), as described herein. In some examples, one or more of the modules can be combined into a single module. That is, in some examples, a single module can perform one or more of the functions described below with reference to the communication module 312 and the user interface (UI) module 318.

The communication module 312 can be configured to facilitate communications on behalf of the device 300. That is, the communication module 312 can send and/or receive calls, messages, and/or data on behalf of the computing device 300. In at least one example, a user can interact with a graphical user interface (GUI) presented via a display of the computing device 300 as described below with reference to FIG. 3.

The UI module 318 may be configured to present data via user interface(s) of the computing device 300. In at least one example, the UI module 318 may receive data and determine a format for presenting the data via user interface(s) of the computing device 300. In at least one example, the UI module 318 may receive data and determine how to graphically present the data via a display of the computing device 300. The computing device 300 may include an encoder 214. The encoder 214 may encode identifiers stored on the computing device 300, such as EIDs, etc. into DTMF signals.

The radio hardware 310 of the computing device 300 provides wireless UE capabilities, such as connecting to a base station, a Wi-Fi network, or other wireless networks. The radio hardware 310 can include or be incorporated into processors, ASICs, programmable circuits such as FPGAs, or in other ways.

Figure 4:
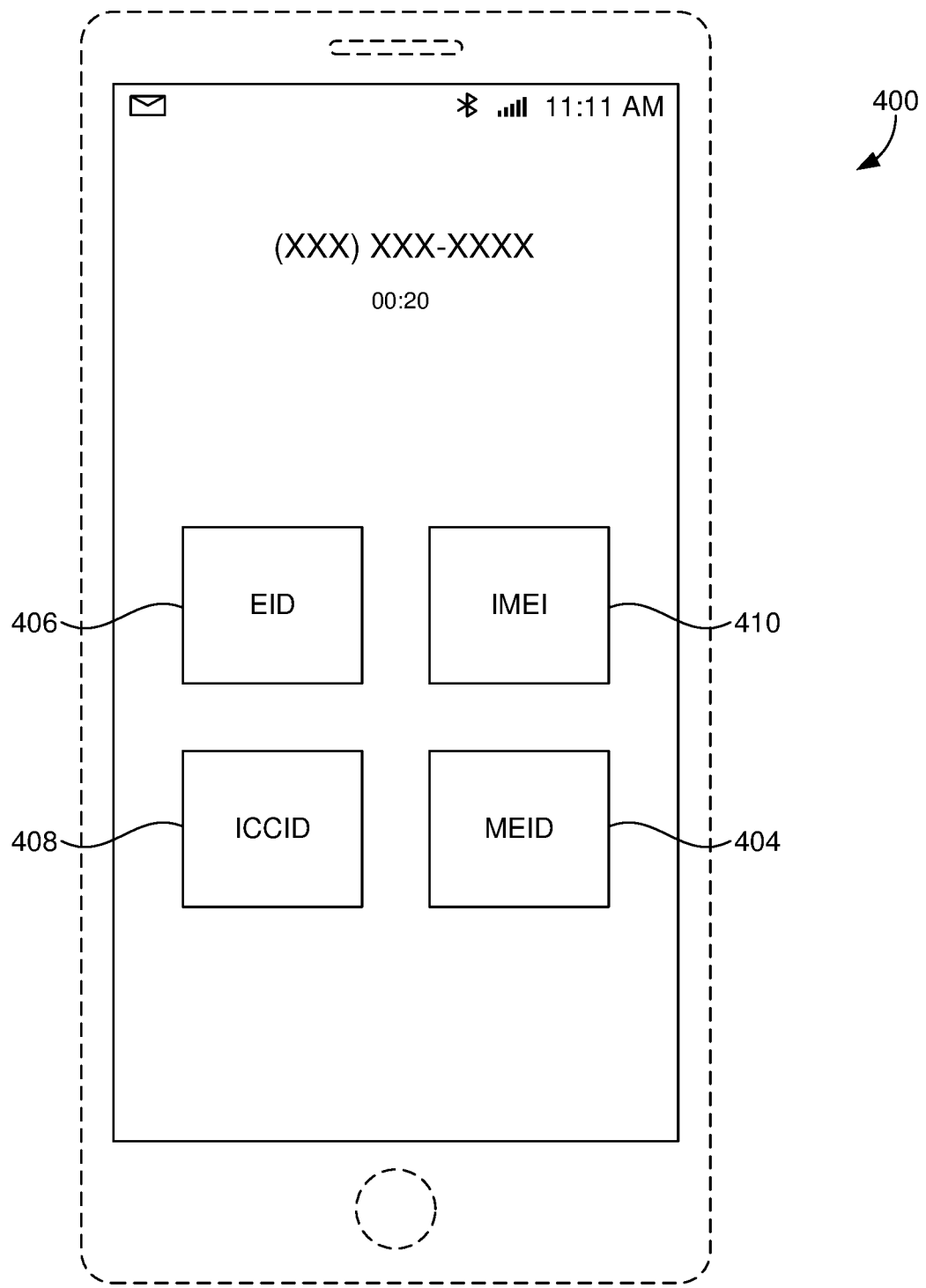
FIG. 4 illustrates an example graphical user interface (GUI) in accordance with embodiments of the present disclosure.

As described, the UI module 318 may be configured to present one or more GUIs via a display of the computing device 300. FIG. 4 illustrate a non-limiting example of a GUI in accordance with embodiments of the present disclosure. In at least one example, the UI module 318 may be configured to present user interface(s) via a display 402 of the computing device 300. In at least one example, the UI module 318 may generate a GUI 400 and may present the GUI 400 via the display 402 of the computing device 300. In at least one example, the GUI 400 may be associated with one or more graphical representations (e.g., 404-410). Each of the graphical representations may be associated with a different identifier, including identifiers associated with the computing device 300. For example, the UI module 318 may generate one or more options on the display 402 in the form of one or icons representing one or more identifiers, such as an EID 406, an ICCID 408, an IMEI 410, and/or a MEID 404. In other embodiments, only the EID 406 may be presented on the display 402. In still other embodiments, one or more of the actual numerical and/or alphanumerical identifiers may be presented on the display 402. For example, the actual thirty-two digit EID may be presented on the display 402.

Figure 5:
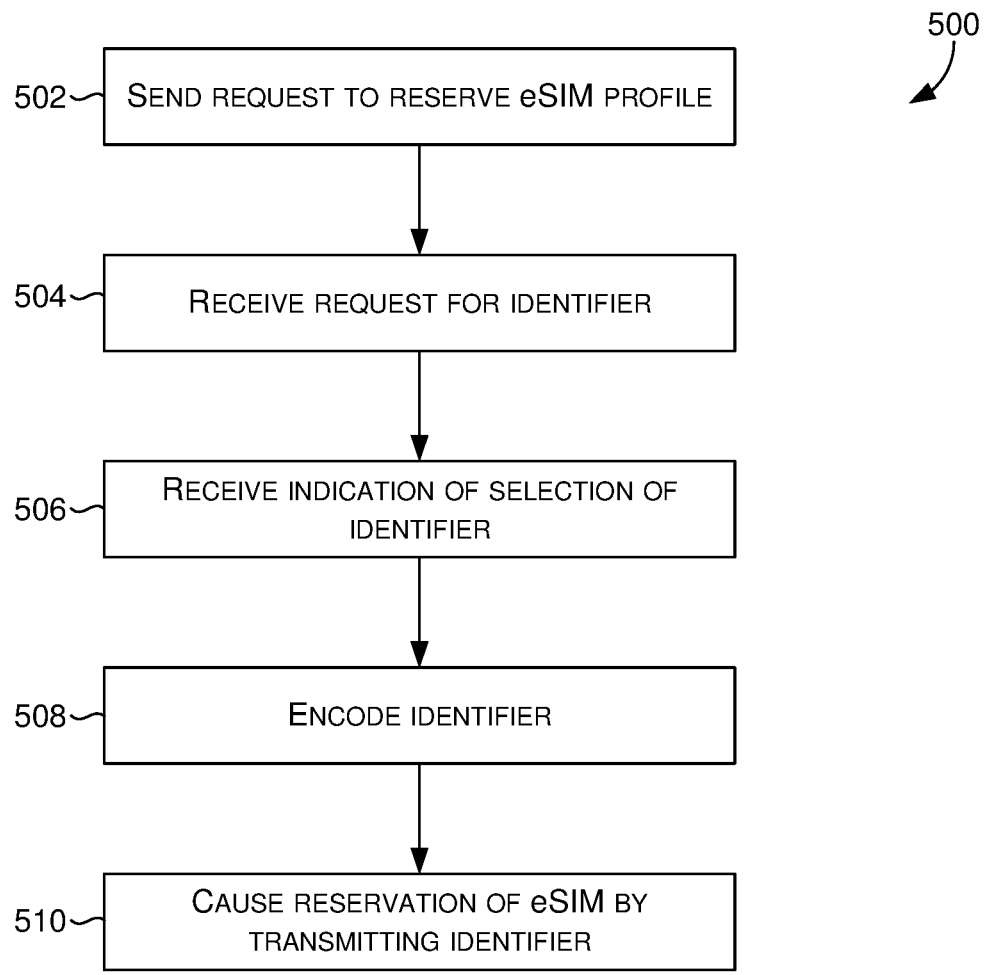
FIG. 5 is a flow diagram illustrating an example call-waiting method for a UE in accordance with embodiments of the present disclosure.

FIG. 5 is a flow diagram illustrating an example eSIM reservation method for a UE in accordance with embodiments of the present disclosure. Initially, at block 502, a UE may send a request to reserve an eSIM profile. For example, a user may make a voice call using the computing device 300 and in particular the communications module 312 of the computing device 300 to a network operator, such as the cell phone carrier that the user wishes to switch service to. At block 504, the UE may receive a request to provide an identifier in response to the request to reserve the eSIM profile. For example, the computing device 300 and in particular the communications module 312 of the computing device 300 may receive the request from the network operator. In certain embodiments, a user may navigate to a menu that displays the actual numerical and/or alphanumerical identifier requested, such as the menu 106 illustrated in FIG. 1 or a menu similar to that illustrated in FIG. 1. For example, the actual thirty-two digit EID may be presented on the display 402. In other embodiments, the identifier may be a representation of the actual identifier, such as an icon representing the actual identifier as illustrated in FIG. 4 through the icons 406, 408, 410, and/or 404. At block 506, a touch indication may be received on the display indicating a selection of the identifier. For example, a user may touch that portion of the display 402 of the computing device 300 associated with the EID icon 406, and the UI module 318 may receive this touch indication. At block 508, the identifier may be encoded. In embodiments, the numerical identifier touched or the numerical identifier associated with the icon touched may be encoded by the encoder 314 of the computing device 300. In embodiments, the identifier may be encoded into one or more audible in-band telecommunications signals. In other embodiments, the identifier may be encoded into one or more DTMF signals. At block 410, the eSIM profile may be reserved for the UE by transmitting the encoded identifier from the UE. For example, once the encoder 314 has encoded the identifier, the communications module 312 may send the encoded identifier the network operator, causing reservation of the eSIM profile for the computing device 300. In further embodiments, the UE may receive the eSIM profile. For example, the network operator may send the eSIM profile to the computing device 300 via the communications module 312 in response to receiving the encoded.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Finally, regarding FIGS. 2 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

The invention claimed is:

1. A method in a communications network comprising:
sending, by a UE, a request to reserve an embedded subscriber identity module (eSIM) profile, wherein the request to reserve the eSIM profile comprises a voice call to a network operator using the UE;
receiving, by the UE, a request to provide an embedded Universal Integrated Circuit Card identifier (EID) in response to the request to reserve the eSIM profile;
displaying on the UE, an icon representing the EID;
receiving a touch indication on a display indicating a selection of the icon representing the EID;
encoding the EID associated with the icon representing the EID into one or more telecommunications signals, wherein the encoding comprises converting the EID into an audible signal; and
causing the eSIM profile to be reserved for the UE by transmitting the one or more telecommunications signals comprising the encoded EID associated with the icon representing the EID from the UE.

2. The method of claim 1, wherein the request to reserve the eSIM profile comprises initiating a voice call.

3. The method of claim 2, wherein the request to reserve the eSIM profile comprises initiation of a voice call.

4. The method of claim 3, wherein transmitting the encoded EID comprises transmitting the audible signal during the voice call.

5. The method of claim 1, wherein the method further comprises receiving by the UE the eSIM profile.

6. A system in a communications network, the system comprising:
a processor; and
one or more computer storage hardware devices storing computer-usable instructions that, when used by the processor, cause the processor to:
send a request to reserve an embedded subscriber identity module (eSIM) profile, wherein the request to reserve the eSIM profile comprises a voice call to a network operator using a UE;
receive a request to provide an embedded Universal Integrated Circuit Card identifier (EID) in response to the request to reserve the eSIM profile;
display on a display of the UE, an icon representing the EID;
receive a touch indication on the display indicating a selection of the icon representing the EID;
encode the EID associated with the icon representing the EID into one or more telecommunications signals, wherein the encoding comprises converting the EID into one or more dual-tone multi-frequency signaling tones; and cause the eSIM profile to be reserved for the UE by transmitting the one or more telecommunications signals comprising the encoded EID associated with the icon representing the EID from the UE.

7. The system of claim 6, wherein the EID comprises a numerical identifier.

8. The system of claim 6, wherein the transmitting occurs at least in part over a circuit-switched network.

9. The system of claim 6, wherein the transmitting occurs at least in part over a packet-switched network.

10. The system of claim 6, wherein the system further comprises receiving by the UE the eSIM profile.

11. Non-transitory computer-readable storage media having stored thereon executable instructions that when executed by a processor of a computing device controls the computing device to perform steps for a call waiting method, the steps comprising:

sending, by a UE, a request to reserve an embedded subscriber identity module (eSIM) profile wherein the request to reserve the eSIM profile comprises a voice call to a network operator using the UE;

receiving, by the UE, a request to provide an embedded Universal Integrated Circuit Card identifier (EID) in response to the request to reserve the eSIM profile;

displaying on the UE, an icon representing the EID;

receiving a touch indication on a display indicating a selection of the icon representing the EID;

encoding the EID associated with the icon representing the EID into one or more telecommunications signals, wherein the encoding comprises converting the EID into one or more dual-tone multi-frequency signaling tones; and causing the eSIM profile to be reserved for the UE by transmitting the one or more telecommunications signals comprising the encoded EID associated with the icon representing the EID from the UE.

12. The non-transitory computer-readable storage media of claim 11, wherein the EID comprises a numerical identifier.

13. The non-transitory computer-readable storage media of claim 11, wherein the transmitting occurs at least in part over a circuit-switched network.

14. The non-transitory computer-readable storage media of claim 11, wherein the transmitting occurs at least in part over a packet-switched network.

15. The non-transitory computer-readable storage media of claim 11, wherein the computer-readable storage media further comprises receiving by the UE the eSIM profile.

* * * * *